(12) United States Patent
Proust et al.

(10) Patent No.: US 9,544,154 B2
(45) Date of Patent: Jan. 10, 2017

(54) METHOD OF AUTHENTICATING A DEVICE

(71) Applicant: GEMALTO SA, Meudon (FR)

(72) Inventors: Philippe Proust, La Ciotat (FR);
Claude Barral, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/372,799

(22) PCT Filed: Jan. 21, 2013

(86) PCT No.: PCT/EP2013/051040
§ 371 (c)(1),
(2) Date: Jul. 17, 2014

(87) PCT Pub. No.: WO2013/117416
PCT Pub. Date: Aug. 15, 2013

(65) Prior Publication Data
US 2015/0304114 A1 Oct. 22, 2015

(30) Foreign Application Priority Data
Feb. 8, 2012 (EP) ..................................... 12305138

(51) Int. Cl.
*H04K 1/00* (2006.01)
*H04L 9/00* (2006.01)
(Continued)

(52) U.S. Cl.
CPC ......... *H04L 9/3278* (2013.01); *G06K 9/00577* (2013.01); *G06K 19/073* (2013.01);
(Continued)

(58) Field of Classification Search
CPC ............. H04L 9/3278; H04L 2209/122; H04L 9/0866; H04L 2209/12; H04L 9/0861; H04L 63/0876; G06K 9/00577; G06K 2009/0059; G06F 21/44; G06F 21/73; G06F 2221/2129
(Continued)

(56) References Cited

U.S. PATENT DOCUMENTS 6,356,753 B1 * 3/2002 Kolev ................... H04W 12/06
455/411
7,898,648 B2 * 3/2011 Ophey ................. G07D 7/0013
356/71
(Continued)

FOREIGN PATENT DOCUMENTS

EP 0583709 A1 2/1994
FR 2866139 A1 8/2005

OTHER PUBLICATIONS

International Search Report (PCT/ISA/210) mailed on Feb. 14, 2013, by the European Patent Office as the International Searching Authority for International Application No. PCT/EP2013/051040.
(Continued)

*Primary Examiner* — Saleh Najjar
*Assistant Examiner* — Feliciano Mejia
(74) *Attorney, Agent, or Firm* — Buchanan Ingersoll & Rooney PC

(57) ABSTRACT

The invention is a method for authenticating a device which comprises a chip and a body carrying the chip. The body comprises a graphical security feature. The method comprises the steps of:
running a first physical unclonable function for generating a first response representative of the chip,
extracting a first reference from the graphical security feature,
authenticating the device by checking that said first response and first reference are linked by a preset mathematical function.

(Continued)

The extracting step and the authenticating step are carried out by a machine distinct from the device.

11 Claims, 3 Drawing Sheets

(51) Int. Cl.
    *H04L 9/28*         (2006.01)
    *H04L 9/32*         (2006.01)
    *G06K 19/073*     (2006.01)
    *G06K 19/08*      (2006.01)
    *G06K 9/00*        (2006.01)

(52) U.S. Cl.
    CPC ... *G06K 19/086* (2013.01); *G06K 2009/0059* (2013.01); *H04L 2209/122* (2013.01)

(58) Field of Classification Search
    USPC .................. 380/28, 44; 713/194; 726/34
    See application file for complete search history.

(56) References Cited

U.S. PATENT DOCUMENTS

| | | | |
|---|---|---|---|
| 8,525,169 B1 * | 9/2013 | Edelstein | H01L 23/544 257/48 |
| 8,622,310 B2 * | 1/2014 | Besling | H04L 9/3278 235/492 |
| 8,705,873 B2 * | 4/2014 | Voloshynovskiy | G06K 9/00 382/218 |
| 8,868,923 B1 * | 10/2014 | Hamlet | H04L 9/00 326/8 |
| 9,071,446 B2 * | 6/2015 | Kreft | G06F 21/71 |
| 2009/0132624 A1 * | 5/2009 | Haselsteiner | G06F 7/588 708/255 |
| 2011/0317829 A1 * | 12/2011 | Ficke | H04L 9/3278 380/46 |

OTHER PUBLICATIONS

Written Opinion (PCT/ISA/237) mailed on Feb. 14, 2013, by the European Patent Office as the International Searching Authority for International Application No. PCT/EP2013/051040.

\* cited by examiner

METHOD OF AUTHENTICATING A DEVICE

TECHNICAL FIELD

The present invention relates to the methods of authenticating a device. It relates particularly to methods of authenticating an electronic device comprising a body carrying a chip.

BACKGROUND

A Physical Unclonable Function (PUF) is a function that is embodied in a physical structure and is easy to evaluate but extremely difficult to predict. An individual PUF component must be easy to make but practically impossible to duplicate, even given the exact manufacturing process that produced it. When a physical stimulus is applied to the structure, it reacts in an unpredictable way due to the complex interaction of the stimulus with the physical microstructure of the component. This exact microstructure depends on physical factors introduced during manufacture which are unpredictable. The applied stimulus is called the challenge, and the reaction of the PUF is called the response. A specific challenge and its corresponding response together form a challenge-response pair which is specific to a given component. Such a challenge-response pair is assumed to be steady. The identity of the component is established by the properties of the microstructure itself.

It is known to authenticate one component of a device by using the result of a PUF execution. For instance, the plastic body of a smart card may be authenticated via a PUF as explained in EP0583709-A1 publication. Such an authentication is limited to the identifying of a single component belonging to a device.

A known attack may be performed by replacing the genuine chip of a device by a fake one. As a result, a genuine body may be associated to a fake chip.

There is a need for increasing the authentication of the genuineness of an electronic device.

SUMMARY OF THE INVENTION

An object of the invention is to solve the above mentioned technical problem.

The object of the present invention is a method for authenticating a device which comprises a chip and a body. The body carries the chip and comprises a graphical security feature. The method comprising the following steps:

running a first physical unclonable function for generating a first response representative of the chip,
  extracting a first reference from the graphical security feature,
  authenticating the device by checking that said first response and first reference are linked by a first preset mathematical function. The extracting step and the authenticating step are carried out by a machine distinct from the device.

Advantageously, the method may comprise the further steps:
  reading a second reference from the chip,
  running a second physical unclonable function for generating a second response representative of said graphical security feature. The authenticating step may be performed by checking that said second response and second reference are linked by a second preset mathematical function.

Advantageously, the graphical security feature may comprise at least one element selected from the group consisting in Optical Variable Ink, Microtext, relief printing, rainbow printing, UV printing, Holographic overlay, Diffractive Optically Variable Image Device, changeable laser image and multiple laser images.

Advantageously, the method may comprise the step of updating an indicator in the chip when the authenticating step is unsuccessful.

Another object of the invention is a device comprising a chip and a body carrying the chip. The device comprises a first means adapted to run a first physical unclonable function able to generate a first response representative of said chip. The body comprises a graphical security feature. The graphical security feature comprises a first reference that has been computed by applying said first response to a first mathematical function. Said first reference is intended to allow the authentication of the device in combination with said first response.

Advantageously, the graphical security feature may comprise at least one element selected from the group consisting in Optical Variable Ink, Microtext, relief printing, rainbow printing, UV printing, Holographic overlay, Diffractive Optically Variable Image Device, changeable laser image and multiple laser images.

Another object of the invention is a system comprising a machine and a device. The device comprises a chip and a body carrying the chip. The device comprises a first means adapted to run a first physical unclonable function able to generate a first response representative of the chip. The body comprises a graphical security feature which comprises a first reference that has been computed by applying said first response to a first mathematical function. Said first reference is intended to allow the authentication of the device in combination with said first response. The machine comprises an extracting means adapted to extract said first reference from the graphical security feature. The machine comprises an authenticating means adapted to authenticate the device by checking that said first response and first reference are linked by said first preset mathematical function. The machine is distinct from the device.

Advantageously, the machine may comprise a reading means adapted to read a second reference from the chip. The machine may comprise a running means adapted to run a second physical unclonable function for generating a second response representative of said graphical security feature. The authenticating means may be adapted to authenticate the device by checking that said second response and second reference are linked by a second preset mathematical function.

Advantageously, the machine may comprise an updating means adapted to update an indicator in the chip if the authenticating means fails to authenticate the device.

Another object of the invention is a method for personalizing a device comprising a chip and a body that carries the chip. The method comprises the following steps:
  running a first physical unclonable function for generating a first response representative of the chip,
  computing a first reference by applying said first response to a first mathematical function and
  writing a graphical security feature which comprises said first reference on the body.

Advantageously, the method for personalizing a device may comprise the further steps:
  running a second physical unclonable function for generating a second response representative of the graphical security feature, computing a second reference by applying said second response to a second mathematical function and writing said second reference into the chip.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of electronic devices comprising a body and a chip. In the following examples, the electronic device is a smart card but it could be any other kind of device. In particular, the electronic device may be an e-passport, a USB token or a secure element connected to a host machine.

The present invention focuses on the link between the genuine chip and the associated genuine body. The present invention relies on the combination of a PUF in order to identify the genuineness of the chip and an associated reference which is included in a graphical security feature on the body. The invention relies on the facts that a physical unclonable function generates a result which is representative of a corresponding hardware component and that it is extremely hard to reproduce a graphical security feature.

The invention allows guaranteeing that the chip and the body which are assumed to belong to a single device have neither been dismantled nor replaced.

Figure 1:
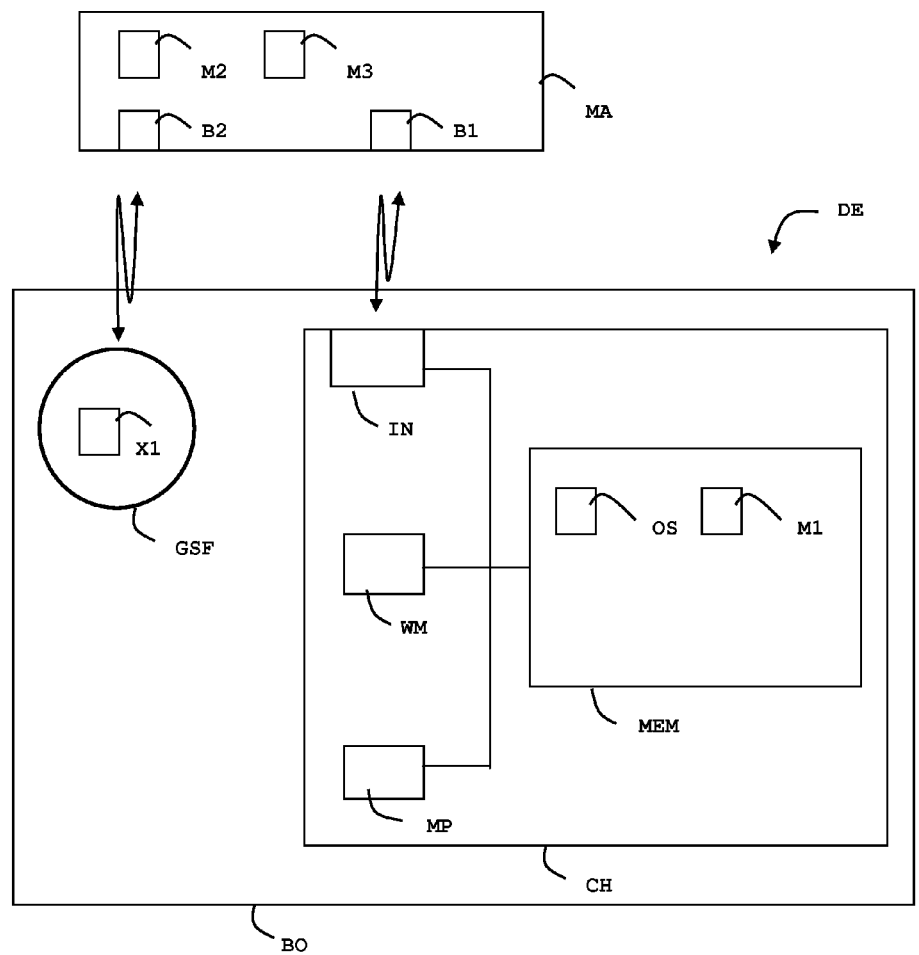
FIG. 1 depicts schematically an example of a system comprising a reading machine and an electronic device according to a first embodiment of the invention.

FIG. 1 shows a first system comprising an electronic device DE which may communicate with a reading machine MA according to a first embodiment of the invention.

The electronic device DE is a contactless smart card and comprises a body BO. This body BO comprises a chip CH and a graphical security feature GSF. The chip CH comprises a non volatile memory MEM, a microprocessor MP, a communication interface IN and a working memory WM. The non volatile memory MEM comprises an operating system OS which may contain a Virtual Machine. The body BO also comprises an antenna (which is not drawn) allowing the device DE to communicate through a contactless protocol. The working memory may be a RAM (Random-Access memory).

The device DE is intended to exchange data with the machine MA through the communication interface IN.

The memory MEM may be implemented as any combinations of one, two or more memories. These memories may be any kind of non volatile memory (for example: NAND flash or EEPROM memory).

The non volatile memory MEM comprises a means M1 which is adapted to run a physical unclonable function PUF1. The function PUF1 is able to generate a response R1 which is representative of the chip CH. The function PUF1 may be a physical unclonable function applied to one or several components of the chip CH. For instance, the function PUF1 may be a PUF of a SRAM (Static Random-Access memory) type which is computed according to the default state of the memory when the SRAM component is started. Such a PUF is based on the uncertainty of the value of each bit of a SRAM memory when the SRAM component is powered. It has been shown that a number of memory points, among all the memory, have the same value for each start of a same component while being different from one component to another within the same family.

The function PUF1 may require a preset challenge as input parameter for generating the response R1. The value of the preset challenge may be stored in the machine MA, in the device DE or even in a remote machine. If needed, the machine MA is able to read the preset challenge from the device DE or from the remote machine.

The graphical security feature GSF comprises a reference X1 which is linked to the response R1 by a preset function F1. For instance, the function F1 may be the identity function wherein X1=R1. The function F1 may be a hash function such as X1 is computed as a hash of R1.

Advantageously, the reference X1 may be hidden in a special subset of the graphical security feature GSF. Alternatively, the graphical security feature GSF may comprise the reference X1 only.

A graphical security feature is generally a printable feature. Reflective and non-reflective printable features formed on substrates having regions with different surface characteristics may be used for example. Graphical security features may also be made of multi-layered features. A graphical security feature may comprise an image containing a material which cannot be seen by the naked eye but which can be made visible under specific conditions.

The graphical security feature GSF may be implemented as one or a combination of many different technologies like Optical Variable Ink, Microtext, relief printing, rainbow printing, UV printing, Holographic overlay, Diffractive Optically Variable Image Device, changeable laser image or multiple laser images for example.

Here are some examples to illustrate the types of technologies which may be used.

The iridescent ink where the colors gradually change their shade from one color to the next.

The guilloches that are printed security lines so that the layout of intersections and geometry is unique. Copying is inhibited by the layout arrangements of fine lines, rainbow print and the exact color calibration.

The Microtext, also named Fineline or microprinting, refers to very thin and small printed characters or entire words. Without the use of a lens the structure appears as a continuous line.

The UV (Ultraviolet) ink is invisible under regular illumination. By viewing the graphical security feature under UV light, all images or texts become visible in a specific color.

The IR (Infrared) ink: By means of a special decoding lens camera applied to an IR enabled camera, the printed IR color becomes invisible whereas all images or texts remain visible on the monitor.

The Optical Variable Ink (called OVI®) that shows different colors as the angle of view changes.

The Printed Hidden Image wherein an image is produced by means of a halftone displacement of the hidden image. The printed hidden image is only visible with a special decoding lens.

The Holograms may be applied to the body surface in a 2- or 3-dimensional appearance.

The Changeable Laser Image (called CLI) and Multiple Laser Image (called MLI) which are integrated into a transparent overlay as a live screen. Up to 2 partial pictures are engraved into the live screen in 2 different angles. CLI focuses on lateral axis while MLI focuses on longitudinal axis.

The reading machine MA may be a computer or any device intended to check the genuineness of another electronic device. In the example of FIG. 1, the machine MA has a contactless interface B1 adapted to communicate with the chip CH and a reading means B2 adapted to read the GSF. Alternatively, the machine MA may have a contact interface able to communicate with the chip CH.

The machine MA comprises an extracting means M2 adapted to extract a reference from the graphical security feature GSF. The machine MA comprises an authenticating means M3 adapted to authenticate the device DE by checking that a response generated by a PUF representative of the chip and a reference extracted from the GSF are linked by a preset mathematical function F1.

Figure 2:
FIG. 2 is an example of a step sequence for authenticating a device according to a one embodiment of the invention.

FIG. 2 shows a sequence of steps for authenticating the genuineness of the device DE according to a first example of the invention.

At a first step, the means M1 runs the PUF1 in order to generate the response R1. An example of PUF1 is described later in this document. The extracting means M2 extracts the reference X1 from the graphical security feature GSF. Note that the execution of PUF1 and the extraction of X1 may be either sequentially or concurrently performed. If needed, a preset value may be used as challenge for PUF1.

At a second step, the authenticating means M3 checks if the result of the application of the response R1 to the function F1 is equal to the reference X1. In other words, the authenticating means M3 checks if X1 is equal to F1(R1). In case of successful checking, the device DE is considered as being a genuine device. For additional examples which should not be considered as limiting, the function F1 may also be implemented as follows. The function F1 may be the encryption of R1 by using a preset pattern as key. The function F1 may also be the encryption of a preset pattern by using R1 as key. The encryption may be any kind of encryption algorithms like DES (Data Encryption Standard) or AES (Advanced Encryption Standard). The function F1 may also be the computation of a XOR (exclusive or) between R1 and a predefined pattern.

According to the invention, the device may be personalized thanks to the following method. At a first step, the function PUF1 is executed in order to generate the response R1 which is representative of the chip CH. At a second step, the reference X1 is computed by applying the response R1 to a preset function F1. At a third step, a graphical security feature which comprises the reference X1 is written on the body of the device.

In an enhanced process, the personalization method may also comprise three additional steps. At a fourth step the function PUF2 is executed in order to generate the response R2 which is representative of the graphical security feature of the body. At a fifth step, a reference X2 is computed by applying the response R2 to a preset function F2. At a sixth step, the reference X2 is written in the chip CH. The function F2 may be implemented with any relevant predictable functions. In particular, the function F2 may be implemented with all examples previously described for the function F1.

Figure 3:
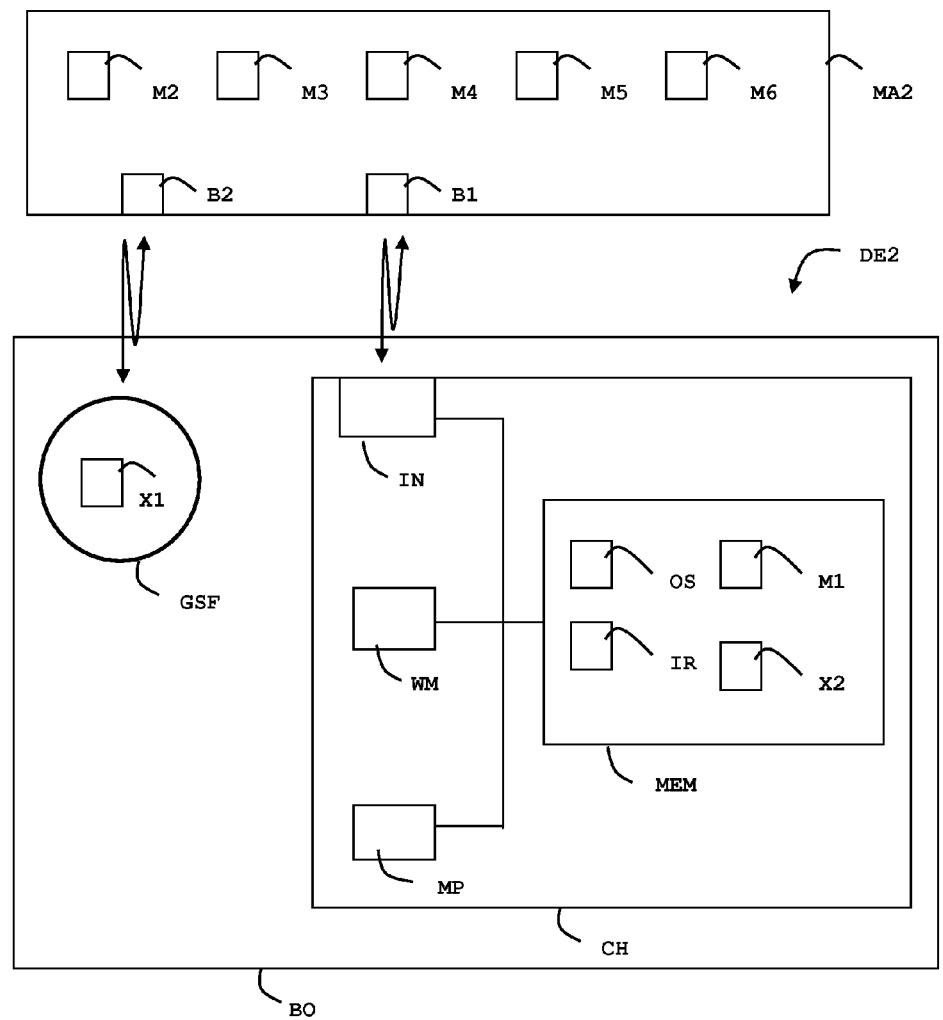
FIG. 3 depicts schematically another example of a system comprising a reading machine and an electronic device according to a second embodiment of the invention.

FIG. 3 shows a second embodiment of the invention wherein a system comprises an electronic device DE2 which may communicate with a reading machine MA2.

The electronic device DE2 of FIG. 3 is similar to the electronic device DE of FIG. 1 with the following differences: the electronic device DE2 comprises a reference X2 and an indicator IR.

The machine MA2 of FIG. 3 is similar to the machine MA of FIG. 1 with the following differences: the machine MA2 comprises a reading means M4, a running means M5 and an updating means M6. The reading means M4 is adapted to read a reference from the chip CH. The running means M5 is adapted to run a physical unclonable function PUF2 for generating a response R2 which is representative of the graphical security feature GSF. The updating means M6 is adapted to update the indicator IR in the chip CH if the authenticating means M3 fails to authenticate the device DE2.

The authenticating means M3 of the device DE2 is similar to the authenticating means M3 of the device DE. In addition, the authenticating means M3 of the device DE2 is able to check that the response R2 and the reference X2 are linked by a second preset mathematical function F2. The preset function F2 may be the identity function, a hash function, a truncate function or any relevant basic or complex function.

Figure 4:
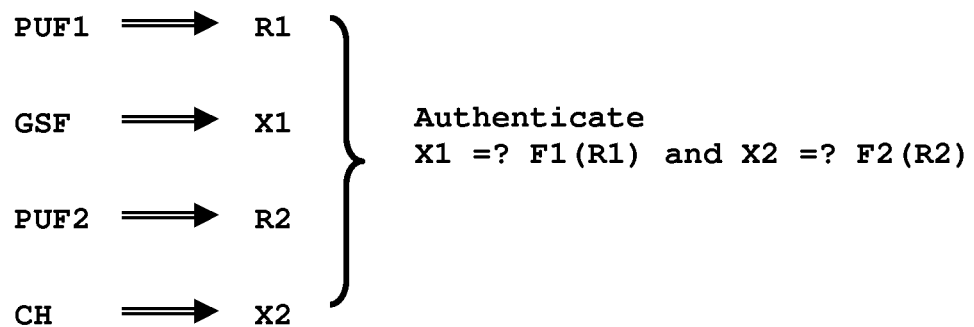
FIG. 4 is an example of a step sequence for authenticating a device according to another embodiment of the invention.

FIG. 4 shows a sequence of steps for authenticating the device DE2 according to a second example of the invention.

At a first step, the means M1 runs the PUF1 in order to generate the response R1 which is representative of the chip CH. The extracting means M2 extracts the reference X1 from the graphical security feature GSF. The reading means M4 gets the reference X2 from the chip CH. This reading operation may be carried out through the contactless interface B1. The running means M5 performs the physical unclonable function PUF2 in order to generate a response R2 which is representative of the graphical security feature GSF.

Note that these four operations may be either sequentially or concurrently performed. If needed, two preset values may be used as challenge for PUF1 and PUF2.

At a second step, the authenticating means M3 perform a double checking operation. The authenticating means M3 checks if the result of the application of the response R1 to the function F1 is equal to the reference X1. Then the authenticating means M3 checks if the result of the application of the response R2 to the function F2 is equal to the reference X2. In other words, the authenticating means M3 checks if X1=F1(R1) and if X2=F2(R2). If these two checking operations are successful, the device DE2 is considered as being a genuine device.

Advantageously, the updating means M6 may update the indicator IR in the chip CH when the authenticating means M3 fails to authenticate the device DE2. Such an indicator may be used for tracking the attempts of authentication. The operating system of the device DE2 may be set for taking defensive actions when the indicator IR reaches a preset threshold.

Note that the functions F1 and F2 may be any suitable functions which generate a value from an input parameter in a predictable manner. The functions F1 and F2 may be either the same functions or different.

The invention allows authenticating the genuineness of an electronic device made of a dynamic hardware component (e.g. a chip) and a passive hardware component (e.g. a body) which must be preserved in its entirety.

The invention claimed is:

1. A method for authenticating a device, said device comprising a chip and a body carrying the chip, wherein the body comprises a graphical security feature said method comprising the following steps:
    running a first physical unclonable function for generating a first response representative of said chip,
    extracting a first reference from the graphical security feature, and
    authenticating the device by checking that said first response and first reference are linked by a first preset mathematical function, said extracting step and authenticating step being carried out by a machine distinct from the device.

2. A method according to claim 1, wherein the method comprises the further steps:
    reading a second reference from the chip, and
    running a second physical unclonable function for generating a second response representative of said graphical security feature,
    and wherein the authenticating step is performed by checking that said second response and second reference are linked by a second preset mathematical function.

3. A method according to claim 1, wherein the graphical security feature comprises at least one element selected from the group consisting of Optical Variable Ink, Microtext, relief printing, rainbow printing, UV printing, Holographic overlay, Diffractive Optically Variable Image Device, changeable laser image and multiple laser images.

4. A method according to claim 1, wherein the method comprises the further step of updating an indicator in the chip if the authenticating step is unsuccessful.

5. A device comprising:
    a chip and a body carrying the chip, said device being configured to run a first physical unclonable function able to generate a first response representative of said chip,
    wherein the body comprises a graphical security feature, and wherein said graphical security feature comprises a first reference that has been computed by applying said first response to a first mathematical function, said first reference comprising data that, in combination with said first response, enables the device to be authenticated.

6. A device according to claim 5, wherein the graphical security feature comprises at least one element selected from the group consisting of Optical Variable Ink, Microtext, relief printing, rainbow printing, UV printing, Holographic overlay, Diffractive Optically Variable Image Device, changeable laser image and multiple laser images.

7. A system comprising:
    a machine, and
    a device, said device comprising a chip and a body carrying the chip, said device being configured to run a first physical unclonable function to generate a first response representative of said chip,
    wherein the body comprises a graphical security feature,
    wherein said graphical security feature comprises a first reference that is computed by applying said first response to a first mathematical function, said first reference enabling the authentication of the device in combination with said first response,
    wherein said machine is configured to extract said first reference from the graphical security feature,
    and wherein said machine is further configured to authenticate the device by checking that said first response and first reference are linked by said first preset mathematical function, the machine being distinct from the device.

8. A system according to claim 7, wherein the machine comprises a computing apparatus configured to read a second reference from the chip to run a second physical unclonable function for generating a second response representative of said graphical security feature, and to authenticate the device by checking that said second response and second reference are linked by a second preset mathematical function.

9. A system according to claim 7, wherein the machine comprises a computing apparatus configured to update an indicator in the chip if the authentication of the device fails.

10. A method for personalizing a device, said device comprising a chip and a body carrying the chip, said method comprising the following steps:
    running a first physical unclonable function for generating a first response representative of said chip,
    computing a first reference by applying said first response to a first mathematical function and
    writing a graphical security feature which comprises said first reference on the body.

11. A method according to claim 10, wherein the method comprises the further steps:
    running a second physical unclonable function for generating a second response representative of said graphical security feature,
    computing a second reference by applying said second response to a second mathematical function and
    writing said second reference into the chip.

* * * * *